US008827066B2

(12) United States Patent
Kim et al.

(10) Patent No.: US 8,827,066 B2
(45) Date of Patent: Sep. 9, 2014

(54) PACKAGE AUTOMATION APPARATUS

(71) Applicant: Electronics and Telecommunications Research Institute, Daejeon (KR)

(72) Inventors: Young Won Kim, Daejeon (KR); Dong Gil Na, Daejeon (KR); Hoon Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/896,953

(22) Filed: May 17, 2013

(65) Prior Publication Data

US 2014/0048383 A1 Feb. 20, 2014

(30) Foreign Application Priority Data

Aug. 14, 2012 (KR) .................. 10-2012-0088781

(51) Int. Cl.
| | | |
|---|---|---|
| *B65G 47/48* | (2006.01) | |
| *B65G 47/49* | (2006.01) | |
| *B07C 5/16* | (2006.01) | |
| *B07C 3/18* | (2006.01) | |
| *B07C 3/02* | (2006.01) | |

(52) U.S. Cl.
CPC .............. *B65G 47/48* (2013.01); *B65G 47/493* (2013.01); *B07C 5/16* (2013.01); *B07C 3/18* (2013.01); *B07C 3/02* (2013.01)
USPC ........... 198/358; 700/221; 700/224; 700/226; 209/583; 209/592; 198/359; 198/349; 198/349.1

(58) Field of Classification Search
CPC ...... B65G 47/44; B65G 47/49; B65G 47/493; B65G 11/08; B07C 3/18; B07C 5/00; B07C 5/16
USPC ......... 198/358, 359, 349, 349.1, 349.5, 349.6; 700/215, 217, 221, 224, 225, 226; 209/552, 576, 583, 584, 592
See application file for complete search history.

(56) References Cited

U.S. PATENT DOCUMENTS

| | | | | |
|---|---|---|---|---|
| 3,040,862 | A * | 6/1962 | Schmermund et al. ........ | 209/552 |
| 7,235,756 | B2 * | 6/2007 | De Leo et al. ................ | 209/584 |
| 7,963,384 | B2 * | 6/2011 | Lafontaine .................... | 198/349 |
| 8,060,243 | B2 * | 11/2011 | Ogawa .......................... | 700/224 |
| 8,499,920 | B2 * | 8/2013 | Ogawa .......................... | 198/358 |
| 8,615,321 | B2 * | 12/2013 | Baldes et al. ................. | 700/213 |

FOREIGN PATENT DOCUMENTS

KR 10-2012-0063378 A 6/2012

\* cited by examiner

*Primary Examiner* — Leslie A Nicholson, III
(74) *Attorney, Agent, or Firm* — LRK Patent Law Firm

(57) ABSTRACT

Provided is a package automation apparatus including: a detection unit configured to detect package information of a package conveyed to a tray; a chute operation unit configured to operate a package loading chute so that the package is loaded on at least one of a plurality of sorting spaces formed at a pallet adjacent to the tray; and a control unit configured to transfer an operation control signal of the package loading chute to the chute operation unit so that the package is loaded on any one of the plurality of sorting spaces, based on the package information, in order to easily sort the package automatically.

5 Claims, 2 Drawing Sheets

PACKAGE AUTOMATION APPARATUS

CROSS-REFERENCE TO RELATED APPLICATIONS

This application claims priority to and the benefit of Korean Patent Application No. 10-2012-0088781 filed in the Korean Intellectual Property Office on Aug. 14, 2012, the entire contents of which are incorporated herein by reference.

TECHNICAL FIELD

The present invention relates to a package automation apparatus, and more particularly, to a package automation apparatus capable of easily and automatically sorting packages.

BACKGROUND

An automatic package sorting operation is performed through the following process at a package processing place of a distribution enterprise and a postal business.

In order to obtain information of an inserting hole entering an automatic sorting tray and a destination of the package, an image and barcode scanning process, an image address information recognizing process, and a barcode recognizing process are performed.

When the package rotates on the tray while the processes progress and then reaches a sorting space corresponding to the recognized information, the package is sorted on the tray and goes down a chute such as a slide to be sorted.

The packages dropping to the sorting space chute are filed in the sorted order, and the operators manually load the package on a pallet. In this process, since the package is not sorted according to a size or a volume of the package, but is sorted and drops in the earlier entering order, it is not easy to load the packages having various sizes or volumes on the pallet.

For example, in a state where a space in which a package having a small volume is received exists, when a package having a large volume is sorted and loaded, the package is loaded while the space to put the small package is empty, and as a result, loading efficiency on the pallet is decreased.

An operation of loading the package on the pallet is a very hard operation as a repetitive operation in which the operator picks up and puts down an object.

Accordingly, when a quantity of packages is large, the operator does not manually handle the supply in accordance with the quantity of packages which are automatically sorted and a sorting speed, and as a result, an alarm that the sorting spaces are at full capacity rings and the operation of the package automation apparatus frequently stops.

Recently, a research for facilitating the sorting and the loading of the package in the package automation apparatus is being conducted.

SUMMARY

The present invention has been made in an effort to provide a package automation apparatus having an advantage of easily and automatically sorting a package.

An exemplary embodiment of the present invention provides a package automation apparatus, including: a detection unit configured to detect package information of a package conveyed to a tray; a chute operation unit configured to operate a package loading chute so that the package is loaded on at least one of a plurality of sorting spaces formed at a pallet adjacent to the tray; and a control unit configured to transfer an operation control signal of the package loading chute by the chute operation unit so that the package is loaded on any one of the plurality of sorting spaces, based on the package information.

According to the exemplary embodiment of the present invention, it is possible to improve operation efficiency when an operator sorts a package according to a volume and a weight and reduce a work load when the operator loads the package, by operating a chute based on package information detected from the package which is moving to the tray so that the package is loaded on at least one of the plurality of sorting spaces formed on the pallet.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
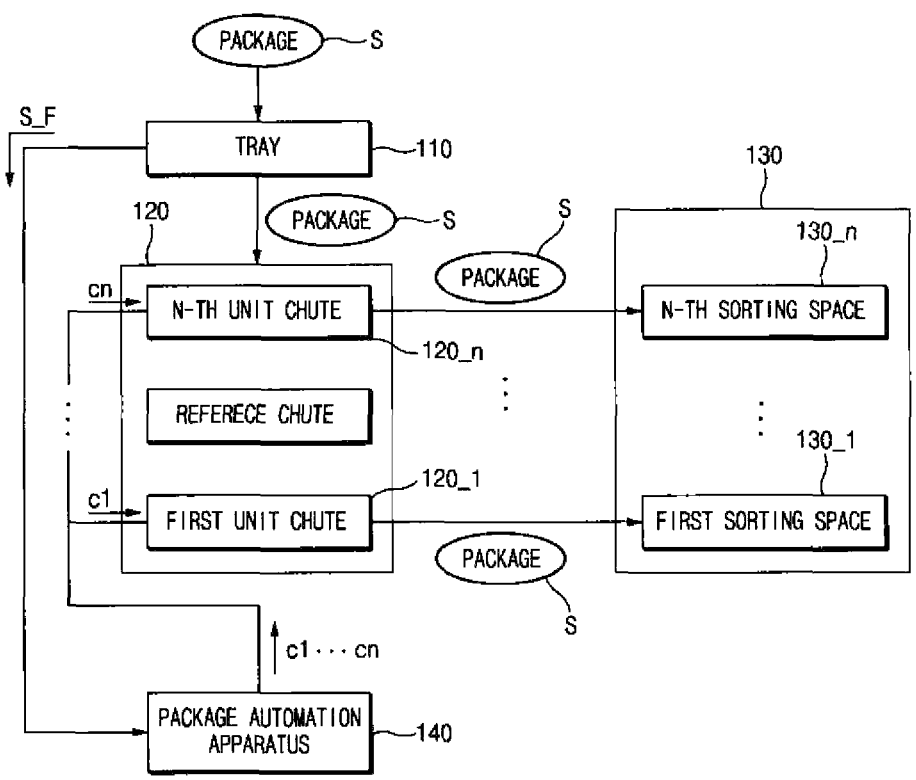
FIG. 1 is a block diagram schematically illustrating a package sorting system to which a package automation apparatus is applied according to an exemplary embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

In describing components of an exemplary embodiment, different reference numerals may refer to components with the same name depending on the drawings and the same reference numeral may refer to the components with the same name in different drawings. However, even in this case, it does not mean that corresponding components have different functions according to an exemplary embodiment or it does not mean that the corresponding components do not have the same functions in different exemplary embodiments, and functions of the respective components will be determined based on a description of the respective components in the corresponding exemplary embodiment.

In describing the exemplary embodiment, when it is determined that the detailed description of the known configuration or function related to the present invention may obscure the gist of the present invention, the detailed description thereof will be omitted.

In describing the components of the exemplary embodiment, terms such as first, second, A, B, (a), (b), and the like may be used. The terms are used to just distinguish the component from other components and the essence, sequence, or order of the corresponding component is not limited by the terms. When it is disclosed that any component is "connected", "coupled", or "linked" to other components, it should be understood that the component may be directly connected or linked to other components, but another component may be "connected", "coupled", or "linked" between the respective components.

Hereinafter, parts required to understand an operation and an effect of a package automation apparatus according to an exemplary embodiment will be described in detail with reference to the accompanying drawings.

FIG. 1 is a block diagram schematically illustrating a package sorting system to which a package automation apparatus is applied according to an exemplary embodiment.

Referring to FIG. 1, a package sorting system 100 may include a tray 110 configured to convey an inserted package S, a package loading chute 120 disposed at a circumference of the tray 110 to correspond to package information S_F of the package S conveyed to the tray 110, a pallet 130 configured to load the package S moved by the package loading chute 120, and a package automation apparatus 140 configured to detect the package information S_F while conveying the package S to the tray 110 and control an operation of the package loading chute 120 adjacent to the pallet 130 to load the package S.

Here, the tray 110 may convey the package S in a predetermined direction in order to automatically sort the inserted package S.

The pallet 130 may be formed by a plurality of sorting spaces 130_1 to 130_n, and the plurality of sorting spaces 130_1 to 130_n may be formed in at least one of a vertical line and a horizontal line, and it is not limited thereto.

The package loading chute 120 may include a reference chute (not illustrated) and a plurality of unit chutes 120_1 to 120_n coupled with the reference chute.

The reference chute may be obliquely formed at a reference inclined angle (not illustrated) toward the pallet 130 from the tray 110.

The plurality of unit chutes 120_1 to 120_n may be varied to a set inclined angle from the reference inclined angle by the package automation apparatus 140.

That is, each of the plurality of unit chutes 120_1 to 120_n may be varied to the set inclined angle so that the package S is loaded on each of the plurality of sorting spaces 130_1 to 130_n according to operational commands c1 to cn of the package automation apparatus 140.

In the exemplary embodiment, the plurality of unit chutes 120_1 to 120_n has the same number as the plurality of sorting spaces 130_1 to 130_n, but the number of the plurality of unit chutes 120_1 to 120_n may be smaller than that of the plurality of sorting spaces 130_1 to 130_n due to the reference chute, but the present invention is not limited thereto.

An operation of a first unit chute 120_1 among the plurality of unit chutes 120_1 to 120_n as an example will be described as follows.

That is, in a state where the first unit chute 120_1 is coupled with the reference chute at the same reference inclined angle as the reference chute in the initial stage, a motor (not illustrated) operating the first unit chute 120_1 operates by the operational command c1 and thus the first unit chute 120_1 is varied to the set inclined angle so that the package S is loaded on the first sorting space 130_1 among the plurality of sorting spaces 130_1 to 130_n, and as a result, the first unit chute 120_1 operates to load the package S moved to the reference chute on the first sorting space 130_1.

In this case, the package automation apparatus 140 may sort and load the package S on the plurality of sorting spaces 130_1 to 130_n by changing an inclined angle of any one unit chute of the plurality of unit chutes 120_1 to 120_n based on the package information S_F.

As such, the package automation apparatus 140 may automate the sorting of the package S performed by the hand of the operator by using the package loading chute 120 having the plurality of unit chutes 120_1 to 120_n and the pallet 130 configured by the plurality of sorting spaces 130_1 to 130_n.

Figure 2:
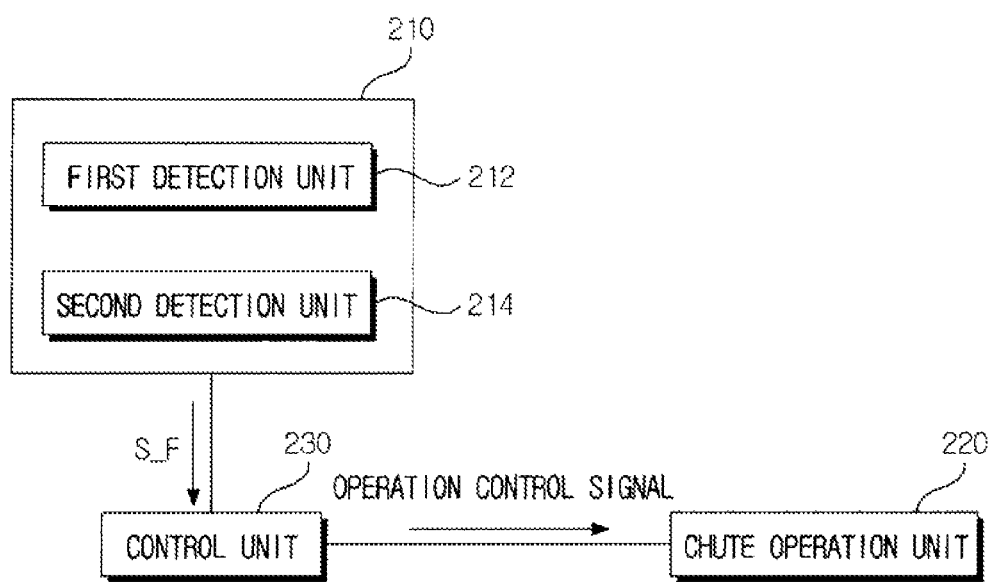
FIG. 2 is a control block diagram illustrating a control configuration of the package automation apparatus illustrated in FIG. 1.

FIG. 2 is a control block diagram illustrating a control configuration of the package automation apparatus illustrated in FIG. 1.

FIG. 2 will be described by using the configuration and the reference numerals illustrated in FIG. 1.

Referring to FIG. 2, the package automation apparatus 140 may include a detection unit 210 configured to detect the package information S_F of the package S conveyed to the tray 110, a chute operation unit 220 configured to operate the package loading chute 120 so that the package S is loaded on any one of the plurality of sorting spaces 130_1 to 130_n formed at the pallet 130 adjacent to the tray 110, and a control unit 230 configured to transfer an operation control signal for the package loading chute 120 to the chute operation unit 220 so that the package S is loaded on any one of the plurality of sorting spaces 130_1 to 130_n based on the package information S_F.

Here, the detection unit 210 may include a first detection unit 212 detecting at least one of a destination and a barcode of the package S and a second detection unit 214 detecting at least one of a volume and a weight of the package S.

That is, the first detection unit 212 may be a recognition device such as infrared equipment and a camera, which may detect the barcode in which information such as a departure and a destination of the package S is input, or may detect a destination and the like written by letters or characters on the package S.

The second detection unit 214 may be a detection device such as infrared equipment and a camera, which may detect at least one of a volume and a weight of the package S.

The second detection unit 214 may include a weight sensor (not illustrated) which is disposed at a predetermined position of the tray 110 to sense the weight of the package S when the package S conveyed to the tray 110 moves to the predetermined position.

In the exemplary embodiment, the first and second detection units 212 and 214 are illustrated as different devices, but may be the same device, and the present invention is not limited thereto.

The chute operation unit 220 may operate at least one of the plurality of unit chutes 120_1 to 120_n by transferring the plurality of operational commands c1 to cn corresponding to the plurality of unit chutes 120_1 to 120_n to a motor (not illustrated) operating each of the plurality of unit chutes 120_1 to 120_n.

That is, the chute operation unit 220 may operate one unit chute of the plurality of unit chutes 120_1 to 120_n corresponding to an operation control signal, when the operation control signal of the control unit 230 is input.

In this case, the chute operation unit 220 operates at a set inclined angle for each of the plurality of unit chutes 120_1 to 120_n to load the package S moved to the reference chute on each of the plurality of sorting spaces 130_1 to 130_n.

The control unit 230 may control to transfer the operation control signal to the chute operation unit 220 by comparing the package information S_F of the package S detected by the detection unit 210 with a set reference.

That is, the control unit 230 determines the chute 120 adjacent to the corresponding pallet 130 so that the package S may be loaded on the pallet 130 corresponding to the destination by comparing the package information S_F with the set reference which is set based on at least one of the destination, the volume, and the weight included in the package information S_F when the package information S_F is input to determine any one of the plurality of sorting spaces 130_1 to 130_$n$ formed at the pallet 130, and determines the unit chute operating to correspond to the determined sorting space of the plurality of unit chutes 120_1 to 120_$n$ to transfer the operation control signal to the chute operation unit 220.

Accordingly, the chute operation unit 220 may operate the unit chute determined in the control unit 230 by one of the operational commands c1 to en based on the operation control signal of the control unit 230.

As described above, the package automation apparatus according to the exemplary embodiment automatically loads the package on the pallet by the unit chutes of the chute, while the package is sorted by the operator, thereby improving operation efficiency.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A package automation apparatus comprising:
   a detection unit configured to detect package information of a package conveyed to a tray;
   a chute operation unit configured to operate a package loading chute so that the package is loaded on at least one of a plurality of sorting spaces formed at a pallet adjacent to the tray; and
   a control unit configured to transfer an operation control signal of the package loading chute to the chute operation unit so that the package is loaded on any one of the plurality of sorting spaces, based on the package information.

2. The package automation apparatus of claim 1, wherein the package information includes at least one of a volume, a weight, a destination, and a barcode of the package.

3. The package automation apparatus of claim 1, wherein the detection unit includes at least one of a camera and a laser which detects the package information.

4. The package automation apparatus of claim 1, wherein
   the package loading chute includes a reference chute inclined at a reference inclined angle toward the pallet from the tray; and a plurality of unit chutes which is coupled with the reference chute, corresponds to the plurality of sorting spaces, and operates from the reference inclined angle to a set inclined angle, and
   the chute operation unit operates the plurality of unit chutes at the set inclined angle, when the operation control signal for the operation of the plurality of unit chutes is input.

5. The package automation apparatus of claim 4, wherein the package information includes at least one of a volume, a weight, a destination, and a barcode of the package, and the control unit outputs the operation control signal so that the package is loaded on the reference sorting space or any sorting space, based on at least one of the volume and the weight.

* * * * *